United States Patent
Seo et al.

(10) Patent No.: US 7,966,639 B2
(45) Date of Patent: Jun. 21, 2011

(54) DIGITAL BROADCAST RECEIVER AND DIGITAL BROADCAST CONTENT PROCESSING METHOD

(75) Inventors: Kwang Min Seo, Yongin (KR); Ji Min Jeong, Seoul (KR)

(73) Assignee: Samsung Electronics Co., Ltd (KR)

( * ) Notice: Subject to any disclaimer, the term of this patent is extended or adjusted under 35 U.S.C. 154(b) by 743 days.

(21) Appl. No.: 11/932,523

(22) Filed: Oct. 31, 2007

(65) Prior Publication Data

US 2008/0104654 A1    May 1, 2008

(30) Foreign Application Priority Data

Oct. 31, 2006    (KR) .............................. 2006-0106480

(51) Int. Cl.
*H04N 7/173* (2006.01)

(52) U.S. Cl. ........................................ 725/134; 725/142
(58) Field of Classification Search .................. None
See application file for complete search history.

(56) References Cited

U.S. PATENT DOCUMENTS

| 6,335,736 | B1 * | 1/2002 | Wagner et al. ................ 715/716 |
| 6,728,966 | B1 * | 4/2004 | Arsenault et al. ............... 725/39 |
| 2004/0266336 | A1 * | 12/2004 | Patsiokas et al. ............ 455/3.04 |
| 2006/0050794 | A1 * | 3/2006 | Tan et al. .................. 375/240.26 |
| 2006/0271971 | A1 * | 11/2006 | Drazin ............................ 725/86 |

FOREIGN PATENT DOCUMENTS

| EP | 967747 A2 * | 12/1999 |
| KR | 1020040072834 | 8/2004 |
| KR | 1020050117826 | 12/2005 |

* cited by examiner

*Primary Examiner* — Brian T Pendleton
*Assistant Examiner* — Jason K Lin
(74) *Attorney, Agent, or Firm* — The Farrell Law Firm, P.C.

(57) ABSTRACT

A digital broadcast receiver and data broadcast content processing method are disclosed. The method uses Program Associated Data (PAD) and includes receiving PAD-based broadcast contents; selecting one of the PAD-based broadcast contents to be stored; storing the selected PAD-based broadcast content in a state existing at the time of selection; selecting a stored PAD-based broadcast content for reproduction; and reproducing the PAD-based broadcast content selected for reproduction. As a result, reproduction of a stored audio broadcast can be delivered with the same level of service as real-time audio broadcast reception.

18 Claims, 6 Drawing Sheets

DIGITAL BROADCAST RECEIVER AND DIGITAL BROADCAST CONTENT PROCESSING METHOD

PRIORITY

This application claims priority under 35 U.S.C. §119(a) to a Korean Patent Application entitled "DIGITAL BROADCAST RECEIVER AND DIGITAL BROADCAST CONTENT PROCESSING METHOD" filed in the Korean Intellectual Property Office on Oct. 31, 2006 and assigned Serial No. 2006-0106480, the contents of which are incorporated herein by reference.

BACKGROUND OF THE INVENTION

1. Field of the Invention

The present invention relates generally to digital broadcasting, and in particular, to a digital broadcast receiver and a digital broadcast content processing method wherein various contents of digital audio broadcasting can be stored during digital broadcast reception and reproduced later.

2. Description of the Related Art

In digital broadcasting, a broadcasting station broadcasts a digitally modulated multimedia signal that includes audio, video, and text. Likewise, digital broadcast receivers receive and reproduce the broadcast multimedia signal. Digital Multimedia Broadcasting (DMB) and Digital Video Broadcasting (DVB) are two examples of current digital broadcasting. DMB may be divided into Terrestrial DMB (T-DMB) or Satellite DMB (S-DMB).

Today, advanced mobile terminals having digital broadcast receiving capabilities, which are equipped with special-purpose multimedia processors or multimedia-enhanced digital broadcast receiving modules, have popularized digital broadcasting services.

In addition, digital broadcasting can provide various data services, such as a Broadcast Web Site (BWS) service and a slide show of still images based on a Multimedia Object Transfer (MOT) protocol, text-based Dynamic Label Segment (DLS) service, an Electronic Program Guide (EPG) based on the eXtensible Markup Language (XML) or voices, a real-time travel and traffic information service based on a Transport Protocol Experts Group (TPEG) protocol, and other interactive service.

However, in a digital broadcasting service, owing to intrinsic characteristics of broadcasting, users normally have to receive and listen to broadcast contents in real time. In other words, once a user misses all or a portion of a digital broadcast content, the user may have difficulty later listening to or viewing the missed digital broadcast content.

SUMMARY OF THE INVENTION

The present invention, a digital broadcast receiver and a digital broadcast content processing method where an audio broadcast and related Program Associated Data (PAD) are received, processed, and stored together so that reproduction of a stored audio broadcast can be delivered with the same level of service as real-time audio broadcast reception.

According to one aspect of the present invention, there is provided a method of digital broadcast content processing for a digital broadcast receiver using Program Associated Data (PAD). The method includes receiving PAD-based broadcast contents; selecting one of the PAD-based broadcast contents to be stored; storing the selected PAD-based broadcast content in a state existing at the time of selection; selecting a stored PAD-based broadcast content for reproduction; and reproducing the PAD-based broadcast content selected for reproduction.

According to another aspect of the present invention, there is provided a method of digital broadcast content processing for a digital broadcast receiver using Program Associated Data (PAD) which includes selecting a stored PAD-based broadcast content for reproduction; searching a mapping table related to the selected PAD-based broadcast content; and reproducing the selected PAD-based broadcast content using the mapping table.

According to another aspect of the present invention, there is provided a method of digital broadcast content processing for a digital broadcast receiver using Program Associated Data (PAD) which includes storing a PAD-based broadcast content being listened; selecting a stored PAD-based broadcast content for reproduction; and reproducing the PAD-based broadcast content selected for reproduction.

According to yet another aspect of the present invention, there is provided a digital broadcast receiver using Program Associated Data (PAD). The receiver includes a display unit for displaying received PAD-based broadcast content; a control unit for controlling selection of a PAD-based broadcast content to be stored, and reproduction of a stored PAD-based broadcast content; and a memory unit for storing the selected PAD-based broadcast content in a state existing at the time of selection for storage.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Figure 1:
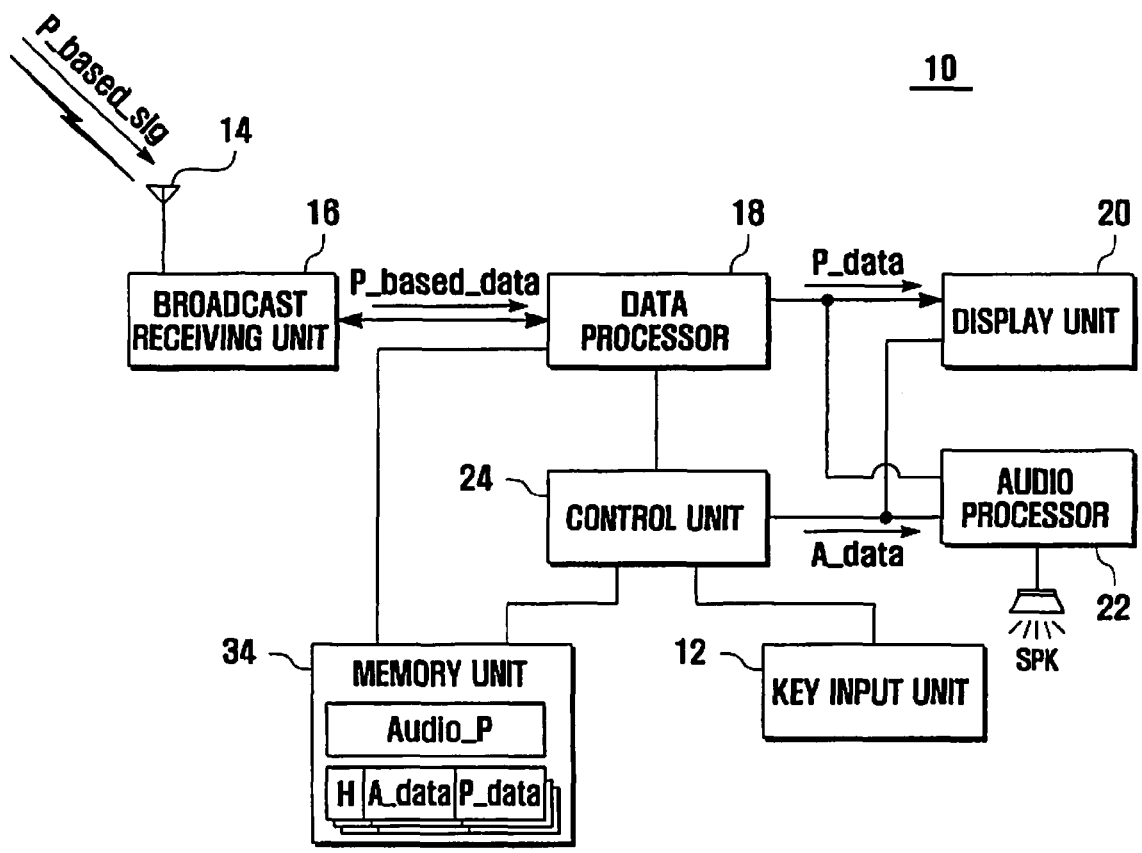
FIG. 1 illustrates a circuit configuration of a digital broadcast receiver according to an exemplary embodiment of the present invention.

Hereinafter, exemplary embodiments of the present invention are described in detail with reference to the accompanying drawings. The same reference symbols identify the same or corresponding elements in the drawings. Detailed descriptions of constructions or processes known in the art may be omitted to avoid obscuring the invention in unnecessary detail. Particular terms may be defined to describe the invention in the best manner. Accordingly, the meaning of specific terms or words used in the specification and the claims should not be limited to the literal or commonly employed sense, but should be construed in accordance with the spirit of the invention. The description of the various embodiments is to be construed as exemplary only and does not describe every possible instance of the invention. Therefore, it should be understood that various changes may be made and equivalents may be substituted for elements of the invention.

The digital broadcast receiver of the present invention is a terminal, and may be any information and communication appliance or multimedia appliance, such as a mobile communication terminal, digital broadcast receiving terminal, personal digital assistant, smart phone, International Mobile Telecommunications 2000 (IMT 2000) terminal, Wideband Code Division Multiple Access (WCDMA) terminal, Universal Mobile Telecommunications System (UMTS) terminal, Global System for Mobile communications (GSM)/General Packet Radio Services (GPRS) terminal.

The present invention relates to Terrestrial Digital Multimedia Broadcasting (T-DMB) and, more particularly, to a supplementary service based on Program Associated Data (PAD) linked to a digital audio broadcast. PAD-based services may include a SLide Show service (SLS) based on the Multimedia Object Transfer (MOT) protocol, Dynamic Label Segment (DLS) service, service based on the Transparent Data Channel (TDC), and Broadcast Web Site (BWS) service based on the MOT protocol. The program associated data may include data for synchronization with an associated audio broadcast. For the purpose of description, SLS and DLS services are used as main examples.

FIG. 1 illustrates a circuit configuration of a digital broadcast receiver according to the present invention.

In FIG. 1, the digital broadcast receiver 10 includes a key input unit 12, broadcast receiving unit 16, data processor 18, display unit 20, audio processor 22, control unit 24, and memory unit 34.

The key input unit 12 includes a plurality of keys for manipulating the digital broadcast receiver 10, and generates a key value corresponding to a key input from the user and sends the generated key value to the control unit 24. The user may enter command keys to store, reproduce, or manage SLS and DLS content.

The broadcast receiving unit 16 receives a digitally modulated broadcast signal through an antenna 14, and demodulates the received broadcast signal into digital broadcast data. In particular, the broadcast receiving unit 16 receives a signal carrying a PAD-based content (P_based_sig), demodulates the signal into a PAD-based broadcast content (P_based_data), and forwards the PAD-based broadcast content to the data processor 18.

The data processor 18 decodes a PAD-based broadcast content from the broadcast receiving unit 16 into audio data (A_data) and PAD data (P_data). The audio data includes an audio stream, and the PAD data includes data to be displayed in synchronization with the audio stream. To decode a PAD-based broadcast content according to protocols, the data processor 18 may include various protocol decoders. For example, if the PAD-based broadcast content is related to an SLS service, the data processor 18 includes an MOT decoder. If the PAD-based broadcast content is related to a DLS service, the data processor 18 includes a DLS decoder. As previously described, although program associated data can be related to MOT, TDC, and DLS-based services, an MOT decoder for an SLS-based service and a DLS decoder for a DLS-based service are described as examples. Further, if the PAD-based broadcast content is compressed, the data processor 18 decompresses the compressed PAD-based broadcast content. The data processor 18 may be included in the control unit 24.

The display unit 20 provides a user interface for reception, processing, storage, and reproduction of digital broadcasts, and displays images related to reception and reproduction of a digital broadcast. In particular, the display unit 20 displays PAD data (P_data) decoded by the data processor 18 according to the type of service. For example, if the PAD data is related to an SLS service, the display unit 20 displays the PAD data in the form of Joint Photographic Experts Group (JPEG) images. If the PAD data is related to a DLS service, the display unit 20 displays the PAD data in the form of character texts.

The audio processor 22 reproduces through a speaker SPK audio data (A_data) decoded by the data processor 18. Here, the audio data is related to a digital broadcast that may be received in real time or stored in the memory unit 34.

The memory unit 34 stores executable programs for operation of the digital broadcast receiver 10, and data related to digital broadcast reception. The memory unit 34 also includes a program memory section and a data memory section.

The program memory section stores an operating system for booting the digital broadcast receiver 10, audio applications (Audio_P) for audio reproduction, application programs for supplementary functions related to photographing and playing of audio and video data, and application programs for storage, reproduction and management of contents. When one of these functions is activated in response to a user request, the digital broadcast receiver 10 executes a corresponding application program under the control of the control unit 24.

The data memory section stores received audio data (A_data) and PAD data (P_data), and sends, if requested, stored audio data and PAD data to the data processor 18 for reproduction through the audio processor 22 and display unit 20. In other words, a PAD-based broadcast content (P_based_data) is stored in units of frames, and a frame includes fields such as a header, audio data (A_data), and PAD data (P_data). When a PAD-based broadcast content is stored, a group label and a mapping table are created for the PAD-based broadcast content.

The control unit 24 assigns a group label to broadcast data received from the start of storage to the end of storage that is to be stored as a PAD-based broadcast content. The group label can be a user-selected filename including the date and time of storage. Group labels identify individual stored PAD-based broadcast contents. Frames constituting a PAD-based broadcast content are stored in the data memory section, and a mapping table is created to link the frames in sequence (for example, a mapping table maps frame identifiers to storage locations of the memory unit 34). The mapping table is used to facilitate selection and reproduction of a stored PAD-based broadcast content.

Moreover, the control unit 24 controls the overall operation of the digital broadcast receiver 10 for, for example, reception, processing, storage, reproduction, and management of a PAD-based broadcast content.

In particular, the control unit 24 temporarily stores a PAD-based broadcast content received in real-time from a broadcasting station in the memory unit 34. When the user terminates content listening or viewing, the temporarily stored PAD-based broadcast content may be removed from the memory unit 34. Because an identical PAD-based broadcast content is repeatedly received, the control unit 24 controls the temporary store operation so that a PAD-based broadcast content having a particular identifier (ID) is not overwritten by another PAD-based broadcast content having the same ID. When an updated PAD-based broadcast content is received, the control unit 24 temporarily stores the updated PAD-based broadcast content in the memory unit 34.

In addition, the control unit 24 controls reception of a PAD-based broadcast content from a broadcasting station, decoding of the PAD-based broadcast content into audio data (A_data) and PAD data (P_data) through decoders corresponding to types of PAD-based services, and reproduction of the audio data and PAD data through the audio processor 22 and display unit 20 in a synchronized manner. The control unit 24 also controls storage of a selected PAD-based broadcast content, and selection, decoding, and reproduction of a stored PAD-based broadcast content.

Figure 2:
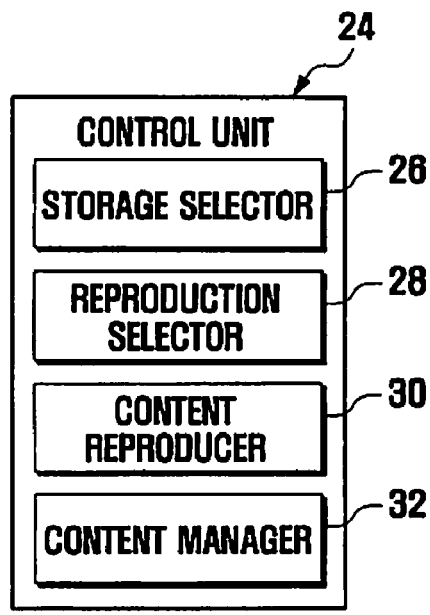
FIG. 2 illustrates a control unit of the digital broadcast receiver of FIG. 1.

FIG. 2 illustrates the control unit 24 of the digital broadcast receiver 10.

In FIG. 2, to perform content processing functions, the control unit 24 includes a storage selector 26, reproduction selector 28, content reproducer 30, and content manager 32.

The content manager 32 performs management functions such as removing a stored content from the memory unit 34 and renaming a stored content.

The storage selector 26 selects one of PAD-based broadcast contents being received and played, and stores the selected PAD-based broadcast content in the memory unit 34. After selection of the PAD-based broadcast content to be stored, the storage selector 26 blocks reception of broadcast data related to the selected PAD-based broadcast content to freeze the selected PAD-based broadcast content in its existing state at the time of selection. For efficient storage of the selected PAD-based broadcast content in the memory unit 34, the storage selector 26 also creates a group label and a mapping table. That is, because a PAD-based broadcast content may be composed of multiple folders and files, the storage selector 26 creates a group label to manage these folders and files. To store the selected PAD-based broadcast content in units of frames, the storage selector 26 creates a mapping table to link the frames in sequence, and stores the selected PAD-based broadcast content in the memory unit 34 using the mapping table. Thereafter the storage selector 26 displays a storage completion indicator on the display unit 20 to notify the user of completion of storage of the PAD-based broadcast content.

The reproduction selector 28 selects, according to a user selection through the key input unit 12, a PAD-based broadcast content stored in the memory unit 34 for reproduction using a group label and mapping table.

The content reproducer 30 sends the selected PAD-based broadcast content for reproduction to the data processor 18, controls decoding of the PAD-based broadcast content through the data processor 18, and reproduction of the decoded PAD-based broadcast content through the audio processor 22 and display unit 20. The content reproducer 30 uses a Content Indicator (CI) stored in PAD data of the PAD-based broadcast content to select a decoder of the data processor 18 to be activated, as illustrated in FIG. 3.

Figure 3:
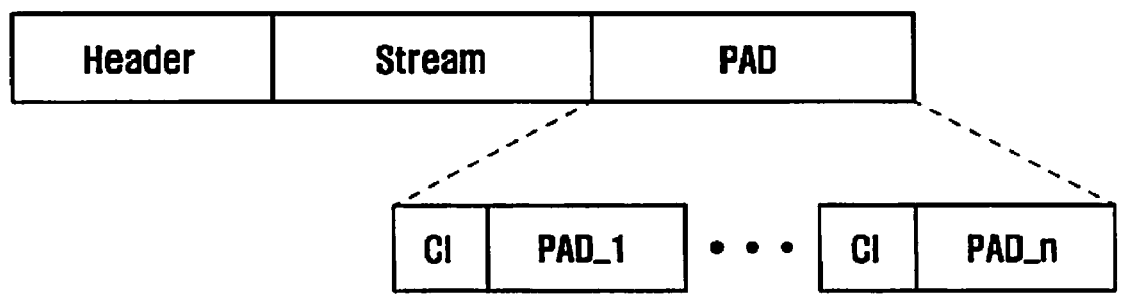
FIG. 3 illustrates a frame format of a PAD-based broadcast content.

FIG. 3 illustrates a frame format of a PAD-based broadcast content according to the present invention.

In FIG. 3, a frame includes a header field for field identification, stream field for storing audio data (A_data), and PAD field for storing PAD data (P_data). The PAD data includes a Content Indicator (CI) indicating the service type for the PAD data. Hence, the content reproducer 30 can control the data processor 18 to activate one of decoders for decoding a PAD-based broadcast content using this CI information.

Figure 4:
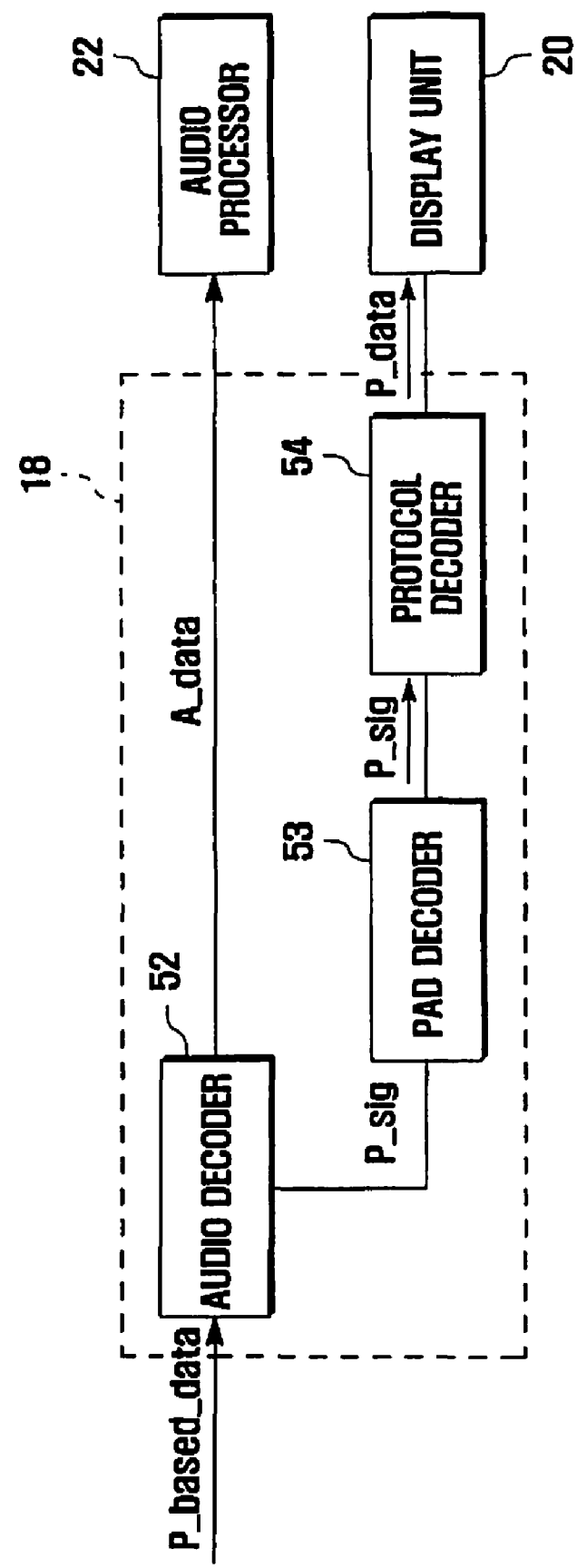
FIG. 4 is a block diagram illustrating decoding of a PAD-based broadcast content.

FIG. 4 is a block diagram illustrating decoding of a PAD-based broadcast content stored in the memory unit 34.

In FIG. 4, the data processor 18 decodes a stored PAD-based broadcast content (P_based_data) selected according to a key signal through the key input unit 12. The data processor 18 includes an audio decoder 52, PAD decoder 53, and protocol decoder 54.

The audio decoder 52 decodes the PAD-based broadcast content into audio data (A_data) and a PAD signal (P_sig), and sends the audio data to the audio processor 22 and the PAD signal to the PAD decoder 53.

The PAD decoder 53 extracts a CI from the PAD signal (P_sig), and activates a decoder corresponding to the extracted CI, as the protocol decoder 54, under the control of the control unit 24. For example, if the CI is '2' or '3', the PAD decoder 53 activates a DLS decoder. If the CI is '12', '13', '14' or '15', the PAD decoder 53 activates an MOT decoder. If the CI is '23', the PAD decoder 53 activates a TDC decoder.

The protocol decoder 54 is a PAD-based decoder such as a DLS decoder, MOT decoder, or TDC decoder that becomes activated according to the CI, and decodes a PAD signal (P_sig) into PAD data (P_data) displayable through the display unit 20. For example, if the protocol decoder 54 is a DLS decoder, it decodes a PAD signal into PAD data of character texts. If the protocol decoder 54 is an MOT decoder, it decodes a PAD signal into PAD data of a still image such as a photograph.

Figure 5:
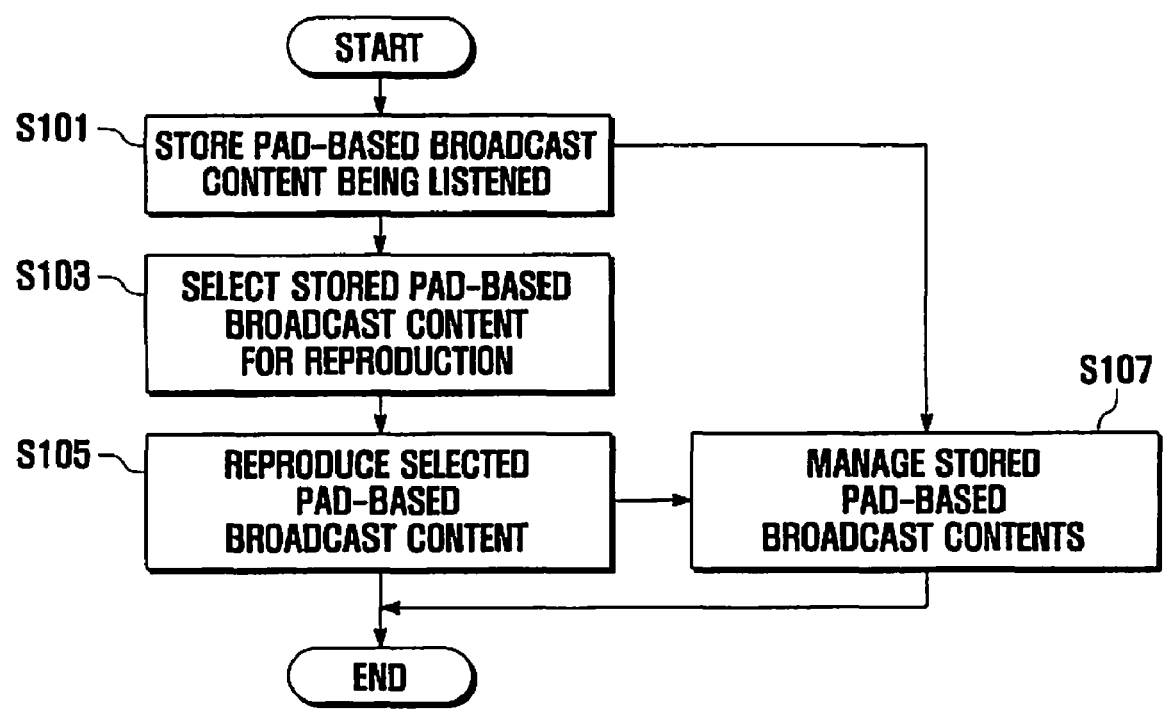
FIG. 5 is a flow chart illustrating a digital broadcast content processing method according to the present invention.

FIG. 5 is a flow chart illustrating a digital broadcast content processing method according to the present invention.

In FIG. 5, when the user of the digital broadcast receiver 10 selects through the key input unit 12 a PAD-based broadcast content being received for storage, the control unit 24 stores the selected PAD-based broadcast content in the memory unit 34 in step S101.

When the user selects a PAD-based broadcast content stored in the memory unit 34 for reproduction in step S103, the control unit 24 reproduces the selected PAD-based broadcast content through the audio processor 22 and the display unit 20 in step S105.

In addition, the control unit 24 performs content management operations, such as removing a stored content from the memory unit 34 and renaming a stored content, according to user requests in step S107.

Figure 6:
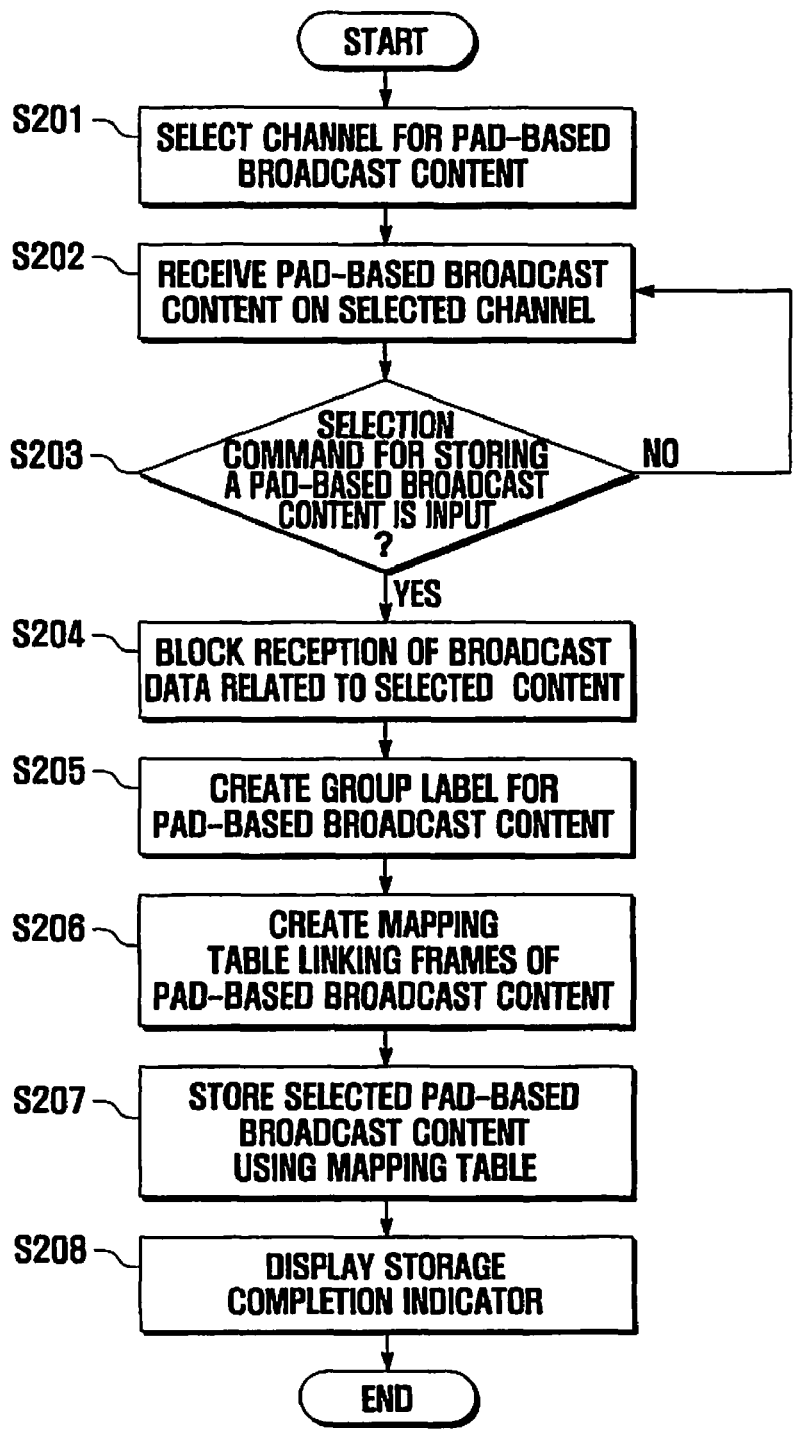
FIG. 6 is a flow chart illustrating a content storing process with respect to the method of FIG. 5.

FIG. 6 is a flow chart illustrating a content storing process with respect to the method described in FIG. 5.

In FIG. 6, when the user tunes to a channel carrying a PAD-based content signal (P_based_sig) through the key input unit 12 in step S201, the control unit 24 demodulates the PAD-based content signal into a PAD-based broadcast content (P_based_data), and delivers the PAD-based broadcast content through the audio processor 22 and display unit 20 to the user in step S202.

At step S202, the control unit 24 controls the audio decoder 52 of the data processor 18 to decode the PAD-based broadcast content into audio data (A_data) and a PAD signal (P_sig). The audio data is reproduced through the audio processor 22 according to execution of an audio application (Audio_P) stored in the memory unit 34. The control unit 24 controls a decoding operation of the data processor 18 to convert the PAD signal into PAD data (P_data), and forwards the PAD data to the display unit 20 for display.

The control unit 24 determines whether a selection command for storing a PAD-based broadcast content is input from the user through the key input unit 12 in step S203. If a selection command for storing a PAD-based broadcast content is input, the control unit 24 blocks reception of broadcast data related to the selected PAD-based broadcast content to freeze the selected PAD-based broadcast content in its existing state at the time of selection for storage in step S204. This is because a PAD-based broadcast content temporarily stored in the memory unit 34 is repeatedly received at regular intervals and updated if necessary, and thereby data inconsistency may be caused.

The control unit 24 creates a group label for the selected PAD-based broadcast content for easy management in step S205. The group label is an identifier of a stored PAD-based broadcast content. Group labels can include a user-specified filename and the date and time of storage for easy identification of individual stored PAD-based broadcast contents.

The control unit 24 also creates a mapping table linking frames of the selected PAD-based broadcast content in step S206, and stores the selected PAD-based broadcast content in the memory unit 34 in units of frames using the mapping table in step S207. The mapping table is used to sequentially link a plurality of frames constituting the labeled PAD-based broadcast content.

Thereafter, the control unit 24 displays a storage completion indicator to notify the user of completion of storing the PAD-based broadcast content in step S208.

Figure 7:
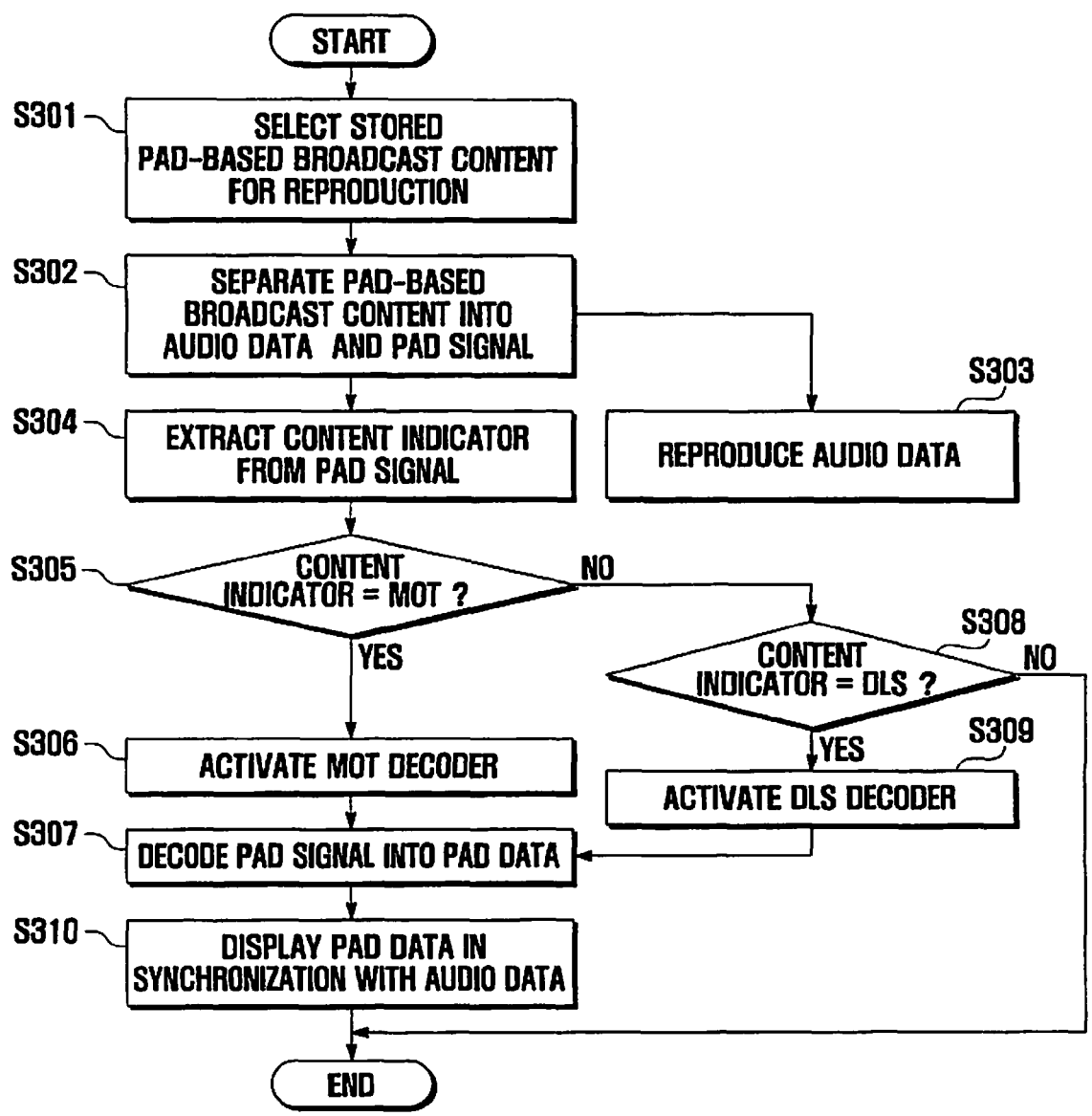
FIG. 7 is a flow chart illustrating a content reproduction process with respect to the method of FIG. 5.

FIG. 7 is a flow chart illustrating a content reproduction process with respect to the method described in FIG. 5.

In FIG. 7, when the user inputs a key signal for reproduction of a stored content through the key input unit 12, the control unit 24 selects and reads a PAD-based broadcast content (P_based_data) stored in the memory unit 34 in step S301. At step S301, the user identifies a stored PAD-based broadcast content for reproduction using an attached group label, and the control unit 24 reads the PAD-based broadcast content to be reproduced from the memory unit 34 using a corresponding mapping table.

The control unit 24 controls the audio decoder 52 of the data processor 18 to decode the PAD-based broadcast content into audio data (A_data) and a PAD signal (P_sig) in step S302.

The audio data is reproduced through the audio processor 22 according to execution of an audio application (Audio_P) stored in the memory unit 34 in step S303.

The control unit 24 controls the PAD decoder 53 of the data processor 18 to extract a Content Indicator (CI) from the PAD signal in step S304.

The control unit 24 determines whether the CI indicates an MOT-based service in step S305. If the CI indicates an MOT-based service, the control unit 24 activates an MOT decoder as the protocol decoder 54 in the data processor 18 in step S306. The MOT-based service may be an SLS service.

The control unit 24 controls the activated decoder to decode the PAD signal into PAD data (P_data) displayable through the display unit 20 in step S307.

If the CI does not indicate an MOT-based service at step S305, the control unit 24 determines whether the CI indicates a DLS-based service in step S308. If the CI indicates a DLS-based service, the control unit 24 activates a DLS decoder as the protocol decoder 54 in the data processor 18 in step S309. The control unit 24 controls the activated decoder to decode the PAD signal into PAD data in step S307.

The control unit 24 controls the display unit 20 to display the PAD data in synchronization with the audio data output at step S304 in step S310.

At step S310, if the PAD data is decoded by the MOT decoder, the PAD data is then displayed as a still image such as a photograph. If the PAD data is decoded by the DLS decoder, the PAD data is then displayed as character texts.

As apparent from the above description, the present invention provides a digital broadcast receiver and a digital broadcast content processing method where an audio broadcast and related Program Associated Data (PAD) are received, processed, and stored together so that reproduction of a stored audio broadcast can be delivered with the same level of service as real-time audio broadcast reception.

While preferred embodiments of the present invention have been shown and described in this specification, it will be understood by those skilled in the art that various changes or modifications of the embodiments are possible without departing from the spirit and scope of the invention as defined by the appended claims.

What is claimed is:

1. A method of digital broadcast content processing for a digital broadcast receiver using Program Associated Data (PAD), comprising:
   receiving PAD-based broadcast contents;
   selecting one of the PAD-based broadcast contents to be stored;
   storing the selected PAD-based broadcast content in a state existing at the time of selection;
   selecting a stored PAD-based broadcast content for reproduction; and
   reproducing the PAD-based broadcast content selected for reproduction,
   wherein when a PAD-based broadcast content is selected for storage, an updated PAD-based broadcast content received by the digital broadcast receiver is decoded and not stored.

2. The method of claim 1, wherein the storing the PAD-based broadcast content comprises:
   creating a group label of the PAD-based broadcast content selected for storage;
   creating a mapping table for sequentially linking frames constituting the selected PAD-based broadcast content;
   storing the selected PAD-based broadcast content using the mapping table; and
   displaying a storage completion indicator on a screen.

3. The method of claim 1, wherein the reproducing the PAD-based broadcast content comprises:
   separating the PAD-based broadcast content to be reproduced into audio data and PAD data;
   identifying a service type using the PAD data;
   activating a decoder corresponding to the identified service type; and
   displaying the PAD data in synchronization with playing the audio data.

4. The method of claim 3, wherein the identifying a service type comprises:
   extracting a content indicator from the PAD data;
   determining whether the extracted content indicator indicates a SLide Show service based on a Multimedia Object Transfer (MOT) protocol, a Dynamic Label Segment-based service, or a Transparent Data Channel-based service; and
   selecting a decoder supporting the service indicated by the content indicator.

5. The method of claim 1, further comprising managing stored PAD-based broadcast contents by removing and renaming a selected stored PAD-based broadcast content.

6. A method of digital broadcast content processing for a digital broadcast receiver using Program Associated Data (PAD), comprising:
   selecting a stored PAD-based broadcast content for reproduction;
   searching a mapping table related to the selected PAD-based broadcast content; and
   reproducing the selected PAD-based broadcast content using the mapping table,
   wherein when a PAD-based broadcast content is selected for storage, an updated PAD-based broadcast content received by the digital broadcast receiver is decoded and not stored.

7. The method of claim 6, wherein the reproducing the selected PAD-based broadcast content comprises:
- separating the PAD-based broadcast content selected for reproduction into audio data and PAD data;
- identifying a service type using the PAD data;
- activating a decoder corresponding to the identified service type; and
- displaying the PAD data in synchronization with playing the audio data.

8. The method of claim 7, wherein the identifying a service type comprises:
- extracting a content indicator from the PAD data;
- determining whether the extracted content indicator indicates a SLide Show service based on a Multimedia Object Transfer (MOT) protocol, a Dynamic Label Segment-based service, or a Transparent Data Channel-based service; and
- selecting a decoder supporting the service indicated by the content indicator.

9. The method of claim 6, wherein the searching a mapping table comprises sequentially retrieving stored frames constituting the PAD-based broadcast content to be reproduced according to the mapping table.

10. A method of digital broadcast content processing for a digital broadcast receiver using Program Associated Data (PAD), comprising:
- storing a PAD-based broadcast content being listened;
- selecting a stored PAD-based broadcast content for reproduction; and
- reproducing the PAD-based broadcast content selected for reproduction,
- wherein when a PAD-based broadcast content is selected for storage, an updated PAD-based broadcast content received by the digital broadcast receiver is decoded and not stored.

11. The method of claim 10, wherein the storing a PAD-based broadcast content comprises:
- creating a group label of the PAD-based broadcast content to be stored;
- creating a mapping table for sequentially linking frames constituting the PAD-based broadcast content to be stored; and
- storing the PAD-based broadcast content using the created mapping table.

12. The method of claim 10, wherein the reproducing the PAD-based broadcast content comprises:
- separating the PAD-based broadcast content selected for reproduction into audio data and PAD data;
- identifying a service type using the PAD data;
- activating a decoder corresponding to the identified service type; and
- displaying the PAD data in synchronization with playing the audio data.

13. The method of claim 12, wherein the identifying a service type comprises:
- extracting a content indicator from the PAD data;
- determining whether the extracted content indicator indicates a SLide Show service based on a Multimedia Object Transfer (MOT) protocol, a Dynamic Label Segment-based service, or a Transparent Data Channel-based service; and
- selecting a decoder supporting the service indicated by the content indicator.

14. A digital broadcast receiver using Program Associated Data (PAD), comprising:
- a display unit for displaying received PAD-based broadcast contents;
- a control unit for controlling selection of a PAD-based broadcast content to be stored, and reproduction of a stored PAD-based broadcast content; and
- a memory unit for storing the selected PAD-based broadcast content in a state existing at the time of selection for storage,
- wherein when a PAD-based broadcast content is selected for storage, the control unit decodes and does not store an updated PAD based broadcast content received by the digital broadcast receiver in the memory unit.

15. The digital broadcast receiver of claim 14, wherein the control unit comprises:
- a storage selector for controlling selection of a PAD-based broadcast content being received for storage;
- a reproduction selector for controlling selection of a stored PAD-based broadcast content for reproduction; and
- a content reproducer for reproducing the PAD-based broadcast content selected for reproduction.

16. The digital broadcast receiver of claim 14, wherein the control unit creates a group label of the PAD-based broadcast content selected for storage, creates a mapping table for sequentially linking frames constituting the selected PAD-based broadcast content, stores the selected PAD-based broadcast content using the mapping table, and displays a storage completion indicator on a screen.

17. The digital broadcast receiver of claim 14, wherein the control unit comprises:
- an audio decoder for decoding a selected PAD-based broadcast content into audio data and PAD data; and
- a protocol decoder for decoding the PAD data according to service types.

18. The digital broadcast receiver of claim 15, wherein the control unit further comprises a content manager for removing and renaming a selected stored PAD-based broadcast content.

* * * * *